United States Patent
Garon et al.

(10) Patent No.: US 10,659,544 B2
(45) Date of Patent: May 19, 2020

(54) OPT-OUT COMPLIANCE

(71) Applicant: Google LLC, Mountain View, CA (US)

(72) Inventors: Haskell Aaron Garon, Brooklyn, NY (US); Nicholas Wildman Isaacs, New York, NY (US); Gang Wang, Jersey City, NJ (US)

(73) Assignee: Google LLC, Mountain View, CA (US)

(*) Notice: Subject to any disclaimer, the term of this patent is extended or adjusted under 35 U.S.C. 154(b) by 154 days.

(21) Appl. No.: 15/812,130

(22) Filed: Nov. 14, 2017

(65) Prior Publication Data

US 2019/0149625 A1 May 16, 2019

(51) Int. Cl.
*H04L 29/08* (2006.01)
*G06F 16/955* (2019.01)
(Continued)

(52) U.S. Cl.
CPC .......... *H04L 67/22* (2013.01); *G06F 16/955* (2019.01); *G06F 16/9535* (2019.01);
(Continued)

(58) Field of Classification Search
CPC ......... H04L 67/22; H04L 67/26; H04L 67/25; H04L 67/36; H04L 67/42; G06Q 30/02;
(Continued)

(56) References Cited

U.S. PATENT DOCUMENTS 7,539,907 B1* 5/2009 Johnsen ............... G06F 11/008 714/26
9,478,042 B1* 10/2016 Khandpur .......... G06Q 30/0242
(Continued)

FOREIGN PATENT DOCUMENTS

WO  WO2004/104851  12/2004
WO  WO2011/150369  12/2011

OTHER PUBLICATIONS

Livingood, J., Mody, N. and O'Reirdan, M., 2012. Recommendations for the Remediation of Bots in ISP Networks (No. RFC 6561). (Year: 2012).*

(Continued)

*Primary Examiner* — John A Follansbee
*Assistant Examiner* — James N Fiorillo
(74) *Attorney, Agent, or Firm* — Fish & Richardson P.C.

(57) ABSTRACT

Methods, systems, and computer readable medium for improving opt-out compliance are disclosed. A method includes identifying an opportunity to transmit a digital component to a client device that is identified by a given unique identifier, accessing a database, identifying, within the database and based on the accessing, an opt-out timestamp specifying when a given user corresponding to the given unique identifier was presented the opt-out opportunity, determining, whether the timestamp indicates that the user was presented with the opportunity within a specified amount of time, and processing the opportunity by submitting the opportunity to transmit the digital component to third party digital component sources in response to determining that the given user was presented with the opportunity within the specified amount of time, or refraining from submitting the opportunity in response to determining that the given user was not presented with the opportunity within the specified amount of time.

17 Claims, 7 Drawing Sheets

(51) Int. Cl.
*G06F 16/9535* (2019.01)
*H04L 29/06* (2006.01)

(52) U.S. Cl.
CPC .............. *H04L 67/20* (2013.01); *H04L 67/26* (2013.01); *H04L 67/36* (2013.01); *H04L 67/02* (2013.01); *H04L 67/025* (2013.01); *H04L 67/306* (2013.01); *H04L 67/42* (2013.01)

(58) Field of Classification Search
CPC .......... G06Q 30/0242; G06Q 30/0246; G06Q 30/0257
USPC .................................. 709/224; 707/802, 812
See application file for complete search history.

(56) References Cited

U.S. PATENT DOCUMENTS

| | | | |
|---|---|---|---|
| 9,755,986 B1* | 9/2017 | Brown | H04L 69/00 |
| 9,860,317 B1* | 1/2018 | Gupta | H04L 67/1097 |
| 10,061,652 B2* | 8/2018 | Johnson | G06F 11/2033 |
| 10,116,732 B1* | 10/2018 | Canton | H04L 41/0813 |
| 10,182,104 B1* | 1/2019 | Canton | H04L 67/10 |
| 10,346,367 B1* | 7/2019 | Luszcz | G06F 16/182 |
| 10,397,051 B1* | 8/2019 | Featonby | H04L 41/0806 |
| 2005/0177599 A1* | 8/2005 | Goodman | G06Q 10/107 |
| 2010/0094878 A1* | 4/2010 | Soroca | G06Q 30/02 707/748 |
| 2011/0191664 A1* | 8/2011 | Sheleheda | G06F 15/173 715/205 |
| 2011/0197114 A1* | 8/2011 | Martin | G06Q 10/107 715/205 |
| 2011/0258049 A1* | 10/2011 | Ramer | G06Q 30/02 705/14.66 |
| 2011/0265168 A1* | 10/2011 | Lucovsky | H04L 63/0245 726/7 |
| 2012/0005026 A1* | 1/2012 | Khan | G06Q 30/02 705/14.64 |
| 2013/0218999 A1* | 8/2013 | Martin | H04L 51/32 709/206 |
| 2014/0108474 A1* | 4/2014 | David | G06F 3/0611 707/827 |
| 2014/0207918 A1* | 7/2014 | Kowalski | H04L 41/0803 709/220 |
| 2014/0207919 A1* | 7/2014 | Kowalski | H04L 41/0896 709/220 |
| 2014/0237070 A1* | 8/2014 | Choi | H04L 67/1097 709/216 |
| 2014/0269335 A1* | 9/2014 | Gupta | H04W 24/10 370/241 |
| 2015/0058467 A1* | 2/2015 | Douglas | G06Q 10/0631 709/223 |
| 2015/0215163 A1* | 7/2015 | Kowalski | H04L 41/0803 714/4.1 |
| 2015/0220973 A1* | 8/2015 | Jager | G06Q 30/02 705/14.45 |
| 2016/0232570 A1* | 8/2016 | Wilson | G06Q 30/0257 |
| 2017/0034012 A1* | 2/2017 | Douglas | H04L 41/5051 |
| 2017/0163731 A1* | 6/2017 | Borlick | H04L 67/1097 |
| 2017/0223117 A1* | 8/2017 | Messerli | G06F 9/5072 |
| 2017/0262638 A1* | 9/2017 | Horowitz | G06F 21/602 |
| 2018/0019969 A1* | 1/2018 | Murthy | H04L 61/2084 |
| 2018/0032399 A1* | 2/2018 | Johnson | G06F 11/142 |
| 2018/0089249 A1* | 3/2018 | Collins | G06F 16/282 |
| 2018/0089250 A1* | 3/2018 | Collins | G06F 16/2365 |
| 2018/0089299 A1* | 3/2018 | Collins | G06F 9/5061 |
| 2018/0091583 A1* | 3/2018 | Collins | H04L 41/0813 |
| 2018/0359311 A1* | 12/2018 | Paramasivam | H04L 67/42 |
| 2019/0012105 A1* | 1/2019 | Schreter | G06F 3/0659 |
| 2019/0147403 A1* | 5/2019 | Lawrence | G06Q 10/107 |
| 2019/0171650 A1* | 6/2019 | Botev | G06F 16/273 |

OTHER PUBLICATIONS

Livingood, J., Mody, N. and O'Reirdan, M., 2012. Recommendations for the Remediation of Bots in ISP Networks (No. RFC 6561). (Year: 2012) (Year: 2012).*

Goldstein D, Lee Y. The rise of right-time marketing. Journal of Database Marketing & Customer Strategy Management. Apr. 1, 2005 ;12(3):212-25. (Year: 2005).*

International Search Report and Written Opinion issued in International Application No. PCT/US2017/061482, dated Feb. 1, 2018, 14 pages.

Zhang "Attribute based encryption made practical," Doctoral dissertation, University of British Columbia, Apr. 1, 2012, 62 pages.

PCT International Written Opinion in International Application No. PCT/US2017/061482, dated Nov. 5, 2019, 9 pages.

* cited by examiner

OPT-OUT COMPLIANCE

BACKGROUND

This document relates to improving opt-out compliance. The Internet provides access to a variety of resources, and in some situations, content providers provide content to users prior to directing the users to requested resources. The content providers can allow users to opt-out of receiving certain content.

SUMMARY

In general, one innovative aspect of the subject matter described in this specification can be embodied in a method that includes identifying, by one or more servers, an opportunity to transmit a digital component to a client device that is identified by a given unique identifier. The method includes accessing, by the one or more servers, a database that includes opt-out timestamps specifying, for each of a plurality of unique identifiers, when an opt-out opportunity was presented to users corresponding to the plurality of unique identifiers. The method also includes identifying, within the database and based on the accessing, an opt-out timestamp specifying when a given user corresponding to the given unique identifier was presented the opt-out opportunity, and determining, by the one or more servers, whether the opt-out timestamp indicates that the given user was presented with the opt-out opportunity within a specified amount of time prior to a present time. The one or more servers process the opportunity to transmit the digital component based on the determination of whether the given user was presented with the opt-out opportunity within the specified amount of time prior to the opportunity to transmit the digital component being identified. This processing can include submitting the opportunity to transmit the digital component to one or more third party digital component sources in response to determining that the opt-out timestamp indicates that the given user was presented with the opt-out opportunity within the specified amount of time prior to the opportunity to transmit the digital component being identified, or refraining from submitting the opportunity to transmit the digital component to the one or more third party digital component sources in response to determining that the opt-out timestamp indicates that the given user was not presented with the opt-out opportunity within the specified amount of time prior to the opportunity to transmit the digital component being identified.

These and other embodiments can each optionally include one or more of the following features.

In some implementations, refraining from submitting the opportunity to transmit the digital component to the one or more third party digital component sources includes selecting, by the one or more servers, a given digital component that includes the opt-out opportunity rather than submitting the opportunity to the one or more third party digital component sources, transmitting, by the one or more servers, the given digital component that includes the opt-out opportunity to the client device in response to identifying the opportunity to transmit a digital component to the client device, determining, by the one or more servers, whether the given digital component that includes the opt-out opportunity was visually presented at the client device; and logging data in the database based on the determination of whether the digital component that includes the opt-out opportunity was visually perceivable at the client device.

In some implementations, transmitting the given digital component that includes the opt-out opportunity includes transmitting the given digital component with an opportunity identifier that uniquely identifies the opportunity to transmit the digital component relative to other opportunities to transmit digital components and an embedded script that causes the client device to generate a response that includes the opportunity identifier when the given digital component is visually perceivable at the client device. In some implementations, determining whether the given digital component that includes the opt-out opportunity was visually perceivable at the client device includes determining that the response received from the client device indicates that the given digital component was visually perceivable at the client device and includes the opportunity identifier. In some implementations, logging data in the database includes logging, in the database, an updated opt-out timestamp at a location of the database corresponding to the given unique identifier, the updated opt-out timestamp indicating a time at which the given digital component was visually perceivable at the client device.

The method can further include identifying a subsequent opportunity to transmit a digital component to the client device after the updated opt-out timestamp is logged in the database, determining that the updated opt-out timestamp indicates that the given user was presented with the opt-out opportunity within the specified amount of time prior to the subsequent opportunity, and in response to determining that the updated opt-out timestamp indicates that the given user was presented with the opt-out opportunity within the specified amount of time prior to the subsequent opportunity, submitting the opportunity to transmit the digital component to one or more third party digital component sources.

In some implementations, submitting the opportunity to transmit the digital component to one or more third party digital component sources in response to determining that the opt-out timestamp indicates that the given user was presented with the opt-out opportunity within the specified amount of time prior to the opportunity to transmit the digital component being identified is conditioned on the user having not requested to opt-out.

Other embodiments of this aspect include corresponding systems, apparatus, and computer programs, configured to perform the actions of the methods, encoded on computer storage devices.

Particular embodiments of the subject matter described in this document can be implemented so as to realize one or more of the following advantages. The system can build a whitelist of users who have been presented with a visible opportunity to opt-out of receiving content items by determining whether a device ID associated with a particular user is stored and mapped to an entry in which an opt-out opportunity was presented and declined. In certain countries, environments, and/or platforms, there has previously been no reliable way to ensure that a user has had the opportunity to opt-out of receiving content, and that shortcoming is addressed by the techniques, devices, and systems discussed herein. The whitelist can be used across many different situations to identify users to whom content items can be presented where there previously was no solution. If a user on the whitelist exercises the option of opting-out, the user is removed from the whitelist, preventing content providers from providing content to users who no longer wish to receive content, and improving the opt-out compliance of content providers that use the whitelist to identify target users. In some examples, users can be removed from the whitelist if they have gone a certain period of time without seeing an opt-out opportunity.

By detecting whether an opt-out opportunity has been visibly presented to a user such that user can exercise the option of opting-out, the system can automatically generate the whitelist of users who have had the opportunity to opt-out of and chosen not to—i.e., opted-in to—receiving content items from certain content providers. Some web resources contain more content than can be displayed at once within a visible portion of the display of a client device. For example, a web page can contain a gallery of images, and if a user accessing the web resource does not scroll down, the user cannot view all of the images in the gallery. If a digital component including the opt-out opportunity is presented within the content—in this example, the gallery of images—that is not visible to the user, the user has not seen the opt-out opportunity even if the user has visited the web page, and the user has not been presented with an opportunity to opt-out. By determining whether the digital component that includes the opt-out element is within a viewport, or a visible portion, of the user's device, the method can ensure that a user is actually given the opportunity to opt-out (e.g., that the opt-out element was actually presented on-screen rather than being included at a portion of a user interface that was not actually presented on-screen).

The whitelist can be used by various types of content providers, including the first party and any third party providers that may not have the infrastructure to build opt-outs into their own content. For example, the whitelist can be used by both content providers and Internet resource hosts. The whitelist improves the compliance of content providers with differing policies across regions and platforms regarding opt-in and opt-out opportunities for users. For example, a resource host can determine whitelisted users to whom content providers can bid to present content to. A content provider can determine whether particular types of content are relevant and/or appropriate for particular users based on whether the users are on the whitelist, thus improving a user's Internet-use experience. Content without opt-out elements can be presented to users who have recently seen an opt-out element, thus conserving computing resources required to transmit and render the content to a user device. Furthermore, content without opt-out elements requires less memory to store, and less time to render than the same content with opt-out elements improving users' browsing experience and reducing user wait times to access resources before which the content is presented. Information other than a user's inclusion on the whitelist, such as interaction data between the users and the party providing the opt-out option, can be used to identify, for example, users who have visited a privacy notice page within a certain period of time and have chosen not to update their privacy settings. The whitelist can be used on various levels, such as the content item level, the page level, or the platform level, and can be used to build separate, discrete whitelists for each level or content provider. The whitelist can be used to determine when to provide opt-out opportunity to a user. For example, the whitelist can be used to identify users who have not had a new opt-out opportunity within a particular amount of time. The identified users can then be presented with an opt-out opportunity within a particular amount of time, or within a particular subsequent number of digital components presented to the user.

Furthermore, leveraging this method of ensuring that users are presented with the opportunity to opt-out of receiving content provides users with the same opt-out controls as provided to other users in different regions on different platforms. This method allows users to control their content settings, and allows them to opt-out in situations in which the users previously did not have such control over their settings. In some regions, environments, platforms, etc., content is not presented to users without allowing the users to opt-out of receiving the content. Thus, this method allows content providers to reach more users, with the users' consent, improving the user's browsing experience.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
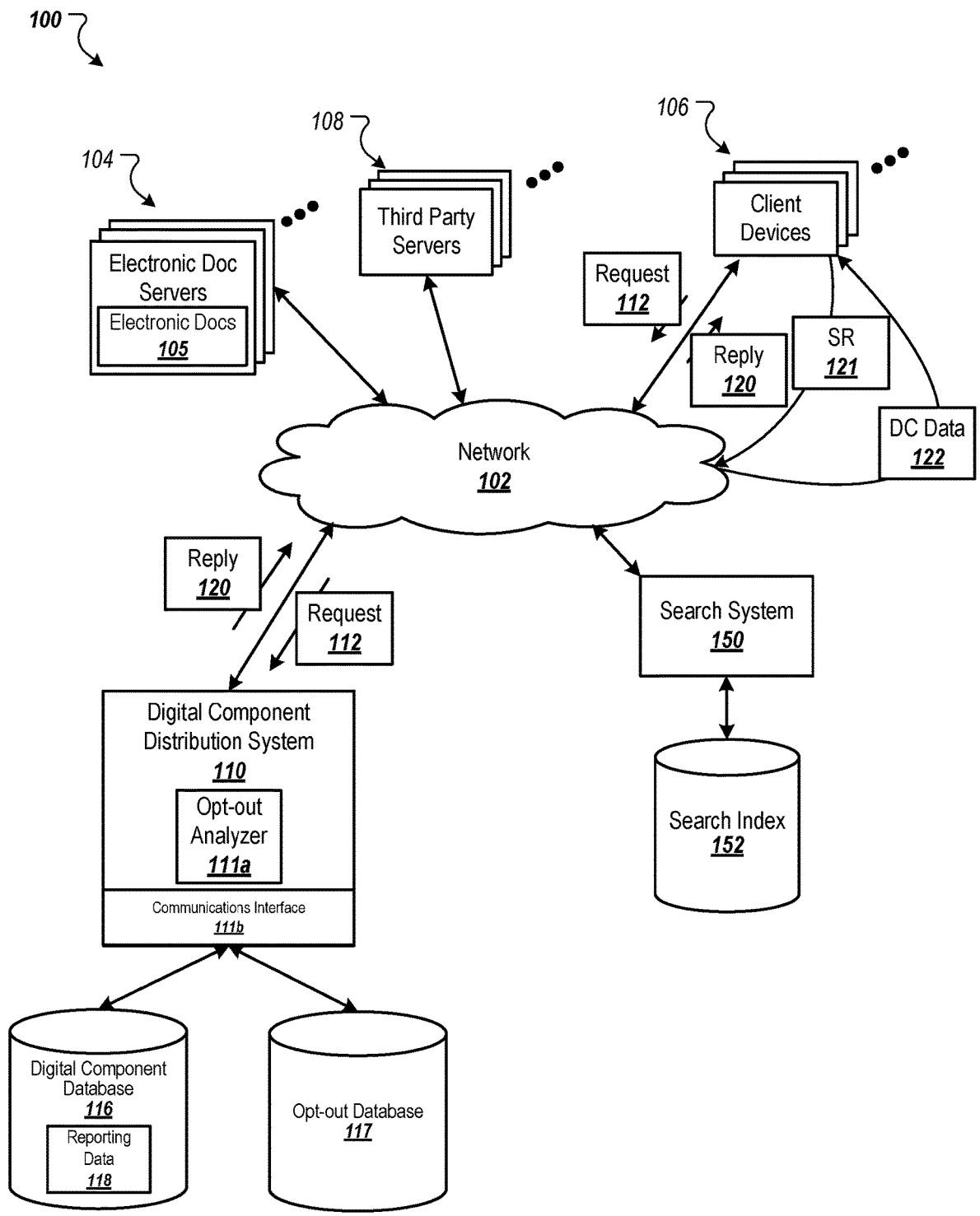
FIG. 1 is a block diagram of an example environment in which digital components are distributed for presentation with electronic documents.

This document describes methods, systems, and devices that improve opt-out compliance across countries, regions, operating systems, and platforms, and allow content providers to target users who have specifically not opted-out of receiving content in environments that did not previously offer the ability to track user opt-outs. In some situations, when a digital component is presented to a user, an opt-out element can be presented with the digital component. For example, an opt-out element can be presented as a user interface element that provides the user with an option to opt-out of receiving content from a particular content provider or a set of content providers, which is referred to as an opt-out opportunity. If the opt-out element is visible to the user and the user chooses not to opt-out, then an identifier associated with the user can be added to a whitelist identifying users to whom content can be presented.

In this example, the server examines a content item that is presented to a user, and in particular situations contents of the uniform resource locator (URL), that is used to contact the tracking server to identify, extract, and log information related to the interaction with the digital component (e.g., an identifier of the client device at which the interaction occurred or an account identifier of a user that performed the interaction). In examples in which user profiles that store a user's content preferences and digital component interaction data are not available, interaction data can be associated with the user through a unique device identifier.

When the digital component includes an opt-out element that is determined to be visible to a user, and the user chooses not to opt-out, the tracking server places the user on a whitelist of users to whom content, or certain types of content can be presented. For example, a user to whom an opt-out option for video content is presented and consequently chooses not to opt-out can be added to a whitelist for video content. Content providers that provide video content can consult the whitelist and, upon determining that the user is on the whitelist for video content, target the user for video content presentation.

Users added to the whitelist can be subsequently removed when the tracking server determines that the user has been presented with an opt-out option with a digital component and has exercised the option by interacting with the opt-out element. For example, a user who has previously declined to opt-out of, and has thus opted-in to, receiving digital content can choose to opt-out of receiving content the next time they are provided with the option. The tracking server will then remove the user from the whitelist to prevent content providers from presenting digital content to the user. In some examples, there are multiple whitelists that each correspond to a particular opt-out element. For example, there may be one whitelist for content related to dairy products while another whitelist relates to vegetables. In such an example, if a user has previously declined to opt-out of all digital content, but subsequently opts-out of receiving content related to dairy products by interacting with a corresponding opt-out element, the tracking server can remove the user from the whitelist related to dairy products.

As discussed above, the amount of computing resources needed to store and render digital components can be reduced by removing opt-out elements from certain digital components being presented to particular users who are on corresponding whitelists. For example, if a user is on a whitelist for a particular category or type of digital component, and a particular period of time has not yet passed, a digital component selected to be presented to the user can exclude an opt-out element.

Additionally, the number of users to whom a content provider can present content can be reduced by relying on the whitelist, and compliance with regional guidelines can be improved when the tracking server adds and removes users from the whitelist based on user interaction with digital components having opt-out elements that are visible to the user.

Note that the techniques described in this document can also be implemented in situations where a user is browsing through available applications (e.g., in an online application store or a web browser) or in other environments (e.g., on publisher web pages). For brevity, much of the description that follows will refer to the search results environment.

As used throughout this document, the phrase "digital component" refers to a discrete unit of digital content or digital information (e.g., a video clip, audio clip, multimedia clip, image, text, or another unit of content). A digital component can be electronically stored in a physical memory device as a single file or in a collection of files, and digital components can take the form of video files, audio files, multimedia files, image files, or text files and include advertising information, such that an advertisement is a type of digital component. Generally, a digital component is defined by (or provided by) a single provider or source (e.g., an advertiser, publisher, or other content provider), but could be a combination of content from multiple sources. Digital components from multiple different sources can be combined into a single electronic document (e.g., collection of various different digital components), and portions of various digital components from different sources can be combined into a single digital component with information extracted from search results (or other portions of content).

FIG. 1 is a block diagram of an example environment 100 in which digital components are distributed for presentation with electronic documents. The example environment 100 includes a network 102, such as a local area network (LAN), a wide area network (WAN), the Internet, or a combination thereof. The network 102 connects electronic document servers 104, client devices 106, third party servers 108, and a distribution system (DCDS) 110 (also referred to as a component distribution system). The example environment 100 may include many different electronic document servers 104, client devices 106, and third party servers 108.

A client device 106 is an electronic device that is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102, but native applications executed by the client device 106 can also facilitate the sending and receiving of data over the network 102.

An electronic document is data that presents a set of content at a client device 106. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents 105 ("Electronic Docs") can be provided to client devices 106 by electronic document servers 104 ("Electronic Doc Servers"). For example, the electronic document servers 104 can include servers that host publisher websites. In this example, the client device 106 can initiate a request for a resource, such as a given publisher webpage, and the electronic document server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can request a resource, such as files required to install an app, download the files at the client device 106, and then execute the downloaded app locally.

Electronic documents 105 can include a variety of content. For example, an electronic document 105 can include static content (e.g., text or other specified content) that is within the electronic document itself and/or does not change over time. Electronic documents 105 can also include dynamic content that may change over time or on a per-request basis. For example, a publisher of a given electronic document 105 can maintain a data source that is used to populate portions of the electronic document 105. In this example, the given electronic document 105 can include one or more tags or scripts that cause the client device 106 to request content from the data source when the given electronic document 105 is processed (e.g., rendered or executed) by a client device 106. The client device 106 integrates the content obtained from the data source into the given electronic document 105 to create a composite electronic document including the content obtained from the data source.

In some situations, a given electronic document 105 can include one or more digital component tags or digital component scripts that reference the DCDS 110. In these situations, the digital component tags or digital component scripts are executed by the client device 106 when the given electronic document 105 is processed by the client device 106. Execution of the digital component tags or digital component scripts configures the client device 106 to generate a request for a resource including one or more digital components 112 (referred to as a "component request"), which is transmitted over the network 102 to the DCDS 110. For example, a digital component tag or digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the DCDS 110 can use to select one or more digital components provided in response to the request. The component request 112 is transmitted, by the client device 106, over the network 102 (e.g., a telecommunications network) to a server of the DCDS 110.

The component request 112 can include event data specifying other event features, such as the electronic document being requested and characteristics of locations of the electronic document at which digital components can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the DCDS 110. Similarly, event data specifying keywords associated with the electronic document ("document keywords") or entities (e.g., people, places, or things) that are referenced by the electronic document can also be included in the component request 112 (e.g., as payload data) and provided to the DCDS 110 to facilitate identification of digital components that are eligible for presentation with the electronic document. The event data can also include a search query that was submitted from the client device 106 to obtain a search results page, and/or data specifying search results and/or textual, audible, or other visual content that is included in the search results.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The DCDS 110 chooses digital components that will be presented with the given electronic document in response to receiving the component request 112 and/or using information included in the component request 112. In some implementations, a digital component is selected (using the techniques described herein) in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document 105 is no longer presented at the client device 106 when the digital component is provided. Such delays are reduced when the digital component is not provided with the content presented to the user. Users can obtain the content more quickly without the digital component, and with less data to transmit and no delay between the database where the component is retrieved and the server that is providing the component, a user's experience is improved.

In some implementations, the DCDS 110 is implemented in a distributed computing system that includes, for example, an opt-out analyzer 111a (e.g. a server that includes computing hardware and code) and a communications interface 111b and/or a set of multiple computing devices that are interconnected and identify and distribute digital component in response to requests 112. The set of multiple computing devices operate together to identify a set of digital components that are eligible to be presented in the electronic document from among a corpus of millions of available digital components. The millions of available digital components can be indexed, for example, in a digital component database 116. Each digital component index entry can reference the corresponding digital component and/or include distribution parameters that contribute to (e.g., condition or limit) the distribution/transmission of the corresponding digital component. For example, the distribution parameters can contribute to the transmission of a digital component by requiring that a component request include at least one criterion that matches (e.g., either exactly or with some pre-specified level of similarity) one of the distribution parameters of the digital component.

The opt-out analyzer 111a (OOA) communicates with the digital component database 116 and an opt-out database 117 through the communications interface 111b. The opt-out database 117 stores and logs interaction data between users and digital components that include opt-out elements, as well as any other opt-out data stored and mapped to the users. The OOA 111a can determine whether a particular user has been presented with an opt-out opportunity within a particular period of time. For example, the OOA 111a can determine, based on timestamps of interaction data between a user and a digital component, that a user has been presented with an opt-out opportunity within the last week, and that the user declined to opt-out at that time. The DCDS 110 uses the determination made by the OOA 111a to select a digital component to provide to the client device 106.

The communications interface 111b provides a connection between the DCDS 110 (and thus, the OAA 111a) and the digital component database 116 that contains reporting data 118 and opt-out database 117. The communications interface 111b allows the 00A 111a to communicate with other devices, such as servers 104 and 108, client devices 106, and a search system, such as search system 150 through the network 102.

The opt-out database 117 contains opt-out data that is stored and mapped to particular users. For example, the opt-out database 117 can include interaction data between a user and a digital component that includes an opt-out element that allows the user to opt-out of receiving digital content. The opt-out database 117 can store a list of users who have been presented with an opportunity to opt-out, and have elected not to exercise the option in a whitelist. The whitelist of users can be updated to remove a user when a specified period of time after the user has seen the opt-out element and has declined to opt-out has expired. When the DCDS 110 receives a request for a digital component, the DCDS 110 can access this whitelist of users to whom digital content can be presented to select a digital component to present to the user. In some examples, the opt-out database 117 stores timestamp data mapped to a user representing how long a user has been presented with an opt-out opportunity or a digital component. For example, the data can be used to measure and log how long the opt-out opportunity was perceivable—if a user was presented with a visible opt-out opportunity from a timestamp at 10:10:21 a.m. to 10:10:31 a.m., the user saw the opt-out opportunity for 10 seconds.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

The OOA 111a of the DCDS 110 can be a tracking server that communicates with various intermediary servers, such as the third party servers 108. The OOA 111a can direct the client device 106 to resources requested by the client device 106 and hosted on various servers, such as the electronic doc servers 105. The DCDS 110 includes a front-end interface that categorizes what a particular piece of digital content is. For example, the front-end interface can be a communications interface, or a pre-processor that receives and processes a request for content to be presented to a client device 106. In some implementations, the front-end interface can include a user interface that includes user interface elements such as buttons and text entry fields. The front-end interface can be, for example, the communications interface 111b, and enables the DCDS 110 to communicate over one or more communications networks, such as the network 102. The DCDS 110 can communicate with servers, such as the servers 104 and 108 through the communications interface 111b. For example, the DCDS 110 can communicate with the third party servers 108 through a proxy server using the communications interface 111b to provide data such as interaction tracking data for the client device 106 when the client device 106 requests a digital component.

The DCDS 110 also includes a back-end that identifies the user (e.g., by way of a user identifier) or client device that submitted the request for content and selects a digital component, based on data from the digital component database 116 and opt-out database 117, to be presented to the client device. In some implementations, the front-end and the back-end of the DCDS 110 can be implemented in the same piece of hardware. In other implementations, the identification of the eligible digital component can be segmented into multiple tasks that are then assigned among computing devices within a set of multiple computing devices. For example, different computing devices in the set of multiple computing devices can each analyze a different portion of the digital component database 116 to identify various digital components having distribution parameters that match information included in the component request 112. The different computing devices in the set of multiple computing devices can use reporting data 118, including user interaction data with particular digital components, stored in the digital component database 116. In some implementations, each given computing device in the set of multiple computing devices can analyze a different data dimension (or set of dimensions) and pass (e.g., transmit) results of the analysis back to the DCDS 110. The identification of the subset of digital components can include, for example, comparing the event data to the distribution parameters, and identifying the subset of digital components having distribution parameters that match at least some features of the event data.

The DCDS 110 aggregates the results received from the set of multiple computing devices and uses information associated with the aggregated results to select one or more digital components that will be provided in response to the request 112. For example, the DCDS 110 can select a set of winning digital components (one or more digital components) based on the outcome of one or more component evaluation processes, as discussed below. In turn, the DCDS 110 can generate and transmit, over the network 102, reply data 120 (e.g., digital data representing a reply) that enables the client device 106 to integrate the set of winning digital components into the given electronic document, such that the set of winning digital components and the content of the electronic document are presented together at a display of the client device 106.

In some implementations, the client device 106 executes instructions included in the reply data 120, which configures and enables the client device 106 to obtain the set of winning digital components from one or more digital component servers. For example, the instructions in the reply data 120 can include a network location (e.g., a Uniform Resource Locator (URL)) and a script that causes the client device 106 to transmit a server request (SR) 121 to the intermediary server 108 to obtain a given winning digital component from the intermediary server 108. In response to the request, the intermediary server 108 will identify the given winning digital component specified in the server request 121 (e.g., within a database storing multiple digital components) and transmit, to the client device 106, digital component data (DC Data) 122 that presents the given winning digital component in the electronic document at the client device 106.

To facilitate searching of electronic documents, the environment 100 can include a search system 150 that identifies the electronic documents by crawling and indexing the electronic documents (e.g., indexed based on the crawled content of the electronic documents). Data about the electronic documents can be indexed based on the electronic document with which the data are associated. The indexed and, optionally, cached copies of the electronic documents are stored in a search index 152 (e.g., hardware memory device(s)). Data that are associated with an electronic document is data that represents content included in the electronic document and/or metadata for the electronic document.

Client devices 106 can submit search queries to the search system 150 over the network 102. In response, the search system 150 accesses the search index 152 to identify electronic documents that are relevant to the search query. The search system 150 identifies the electronic documents in the form of search results and returns the search results to the client device 106 in a search results page.

A search result is data generated by the search system 150 that identifies an electronic document that is responsive (e.g., relevant) to a particular search query, and includes an active link (e.g., hypertext link) that causes a client device to request data from a specified network location (e.g., URL) in response to user interaction with the search result. An example search result can include a web page title, a snippet of text or a portion of an image extracted from the web page, and the URL of the web page. Another example search result can include a title of a downloadable application, a snippet of text describing the downloadable application, an image depicting a user interface of the downloadable application, and/or a URL to a location from which the application can be downloaded to the client device 106.

In some situations, the search system 150 can be part of, or interact with, an application store (or an online portal) from which applications can be downloaded for install at a client device 106 in order to present information about downloadable applications that are relevant to a submitted search query. Like other electronic documents, search results pages can include one or more digital component slots in which digital components (e.g., video clips, audio clips, images, or other digital components that can be formatted as advertisements) can be presented.

Figure 2A:
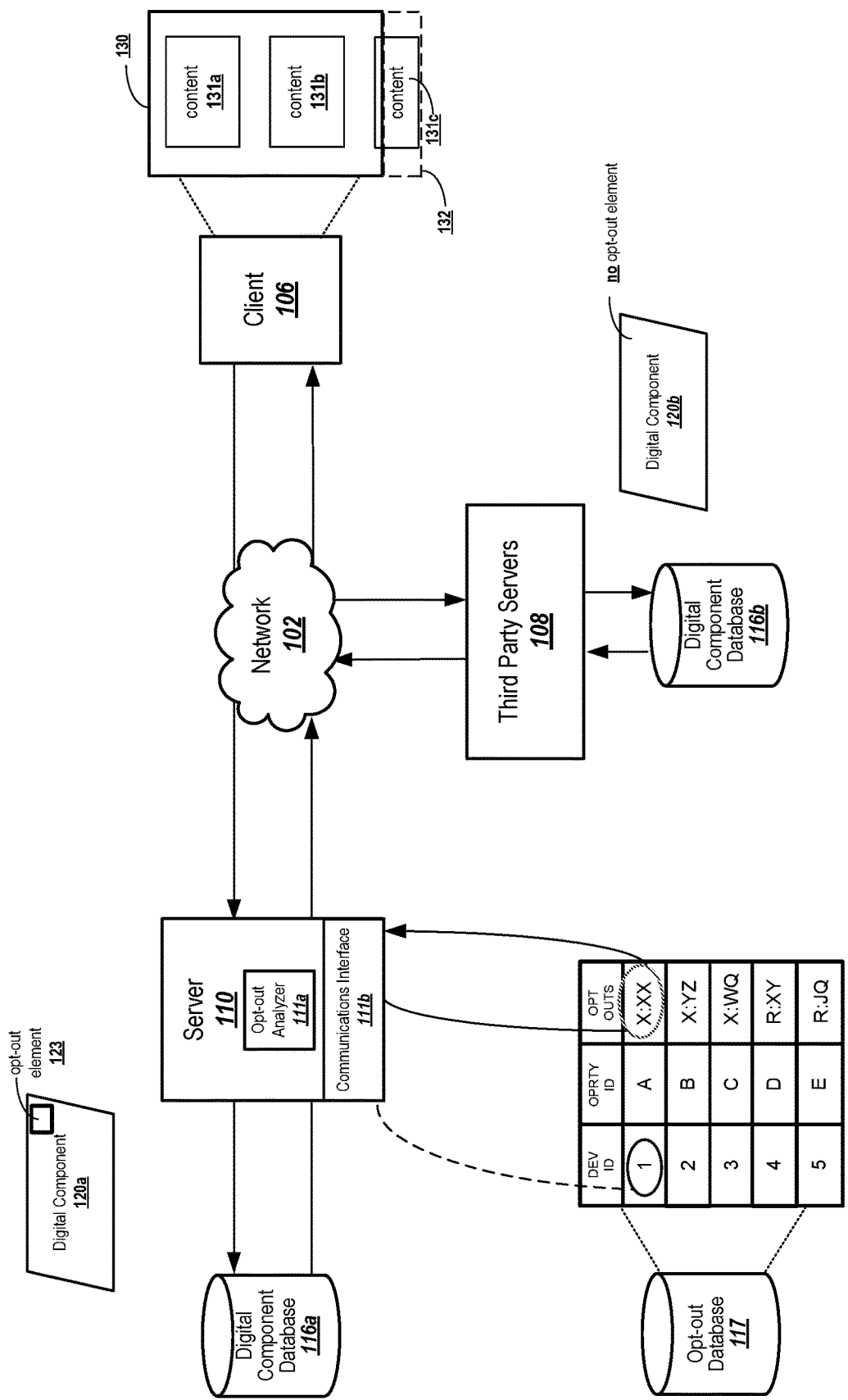
FIGS. 2A-2B are example data flows for distributing a digital component in the example environment of FIG. 1.

FIG. 2A is an example data flow 200 for distributing a digital component in the example environment of FIG. 1. Operations of the data flow 200 are performed by the 00A, or server, 110 contacting client device 106 and third party server 108. In some implementations, stages of the flow 200 are performed within a network environment, such as the environment 100.

In some examples, the client device 106 is a mobile device, such as a cellphone, a virtual reality device (e.g., implemented in a headset or other device such as a combination of a speaker and a display), a smartphone, a personal digital assistant (e.g., implemented in a tabletop speaker or other device such as a combination of a speaker and a display), or a tablet, and communicates over a wireless network. Servers 108 and 110 may communicate over a wired network separate from the wireless network over which the client device 106 communicates. For example, the client device 106 may be a smartphone that communicates over a wireless cellular network, while servers 108 and 110 may be remote servers that communicate over wired networks.

The client device 106 includes a display that presents content to a user of the client device 106. The visible portion of the content is within a viewport 130 of the display. In some implementations, the viewport 130 is a visible portion of a particular application or web page that a user of the client device 106 is accessing. For example, if a digital component is presented within an application that does not cover the entire visible area of the display of the client device 106, then the viewport 130 is determined to be the visible portion of the application. On certain web pages, there may be more content than can be displayed at once within the viewport 130. Such content may be on the same web page as the content within the viewport 130 of device 106, but is not actually visible to a user, and is within an out-of-view portion 132 of the client device 106. For example, the content 131*a* and content 131*b* is visible within viewport 130, but content 131*c* is within portion 132 that is not visible to a user of the client device 106.

Server 110 receives a request for content from the client device 106 over the network 102 through the communications interface 111*b*, and selects a digital component for presentation at the client device 106 based on the request. For example, server 110 may determine that the client device 106 has interacted with a digital component provided by a digital component provider through a digital component server. The digital component provider may request interaction tracking data from the interaction of the client device 106 with the digital component for their own analytics. Each request 112 creates an opportunity to present a digital component to the client device 106, and each opportunity is identified by a unique opportunity identifier. The interaction tracking data can include the opportunity identifier, and can be stored by the opt-out database 117 to determine whether a user has opted-out of receiving digital content within a specified period of time.

The 00A 111*a* of server 110 identifies, based on the received request, a unique identifier associated with the request. The unique identifier can be, for example, a device identifier. In some implementations, the unique identifier can be a user identifier that is carried across platforms and devices. For example, the unique identifier can be a user account used across browsers and devices, and can be used regardless of whether the user is using a software application or a web application.

The unique identifier can be protected when sent to third parties. For example, the unique identifier can be encrypted when sent in the forwarded opportunity to presented content. In some examples, the forwarded opportunity and the unique identifier can be transmitted over the Secure Sockets Layer (SSL). In some examples, the unique identifier associated with a user of the client device 106 can be reset through various methods, including via a factory reset of the client device 106. A user can also opt-out of having their unique identifier sent in any requests for content at all.

Use of the unique identifier allows content providers to reach more users and provide users with content more relevant to the users' interests, improving the users' browsing experience while increasing the reach of various content providers.

The OOA 111*a* accesses opt-out data from the opt-out database 117 to determine whether a user associated with the unique identifier is stored in database 117 on a whitelist of users to whom content may be presented. The whitelist is determined based on whether, within a specified period of time, a user has been presented with a visible opt-out opportunity and declined to opt-out. For example, the OOA 111*a* can determine whether an opt-out opportunity presented to the user is within the viewport 130 of the user's device 106. The OOA 111*a* can then determine whether the visible opt-out opportunity was presented within a specified period of time. This period of time can be determined based on, for example, regional regulations for opt-out rights for users. Server 110 accesses the opt-out database 117 through the communications interface 111*b* to identify a stored entry mapped to the identified user.

Once the OOA 111*a* determines that the user is on the whitelist of users to whom content may be presented, the OOA 111a can determine to present the user with a digital component that does not include an opt-out opportunity. If the OOA 111a determines that the user is not on the whitelist of users to whom content may be presented, the OOA 111a can determine to present the user with a digital component that includes an opt-out opportunity. In some implementations, there is no guarantee that digital content provided by third party server 108 includes an opt-out opportunity. Therefore, in situations in which the OOA 111a determines that the identified user is not on the whitelist and must be presented with a digital component including an opt-out opportunity, the DCDS 110 selects a digital component from the digital component database 116a. For example, the DCDS 110 can select a digital component 120a that includes an opt-out element 123 to be presented to the client device 106.

In situations in which the OOA 111a determines that the identified user is on the whitelist, the OOA 111a can forward the opportunity to present a digital component to a third party, such as third party server 108. Server 108 can select a digital component from a digital component database 116b separate from the digital component database 116a. For example, the DCDS 110 can select a digital component 120b that does not include an opt-out element.

The DCDS 110 then provides the selected digital component 120 to the client device 106 through the network 102. For example, the DCDS 110 can retrieve the digital component 120 from the digital component database 116 (either the database 116a or the database 116b) and transmit the digital component 120 to the client device 106 over the network 102.

Figure 2B:
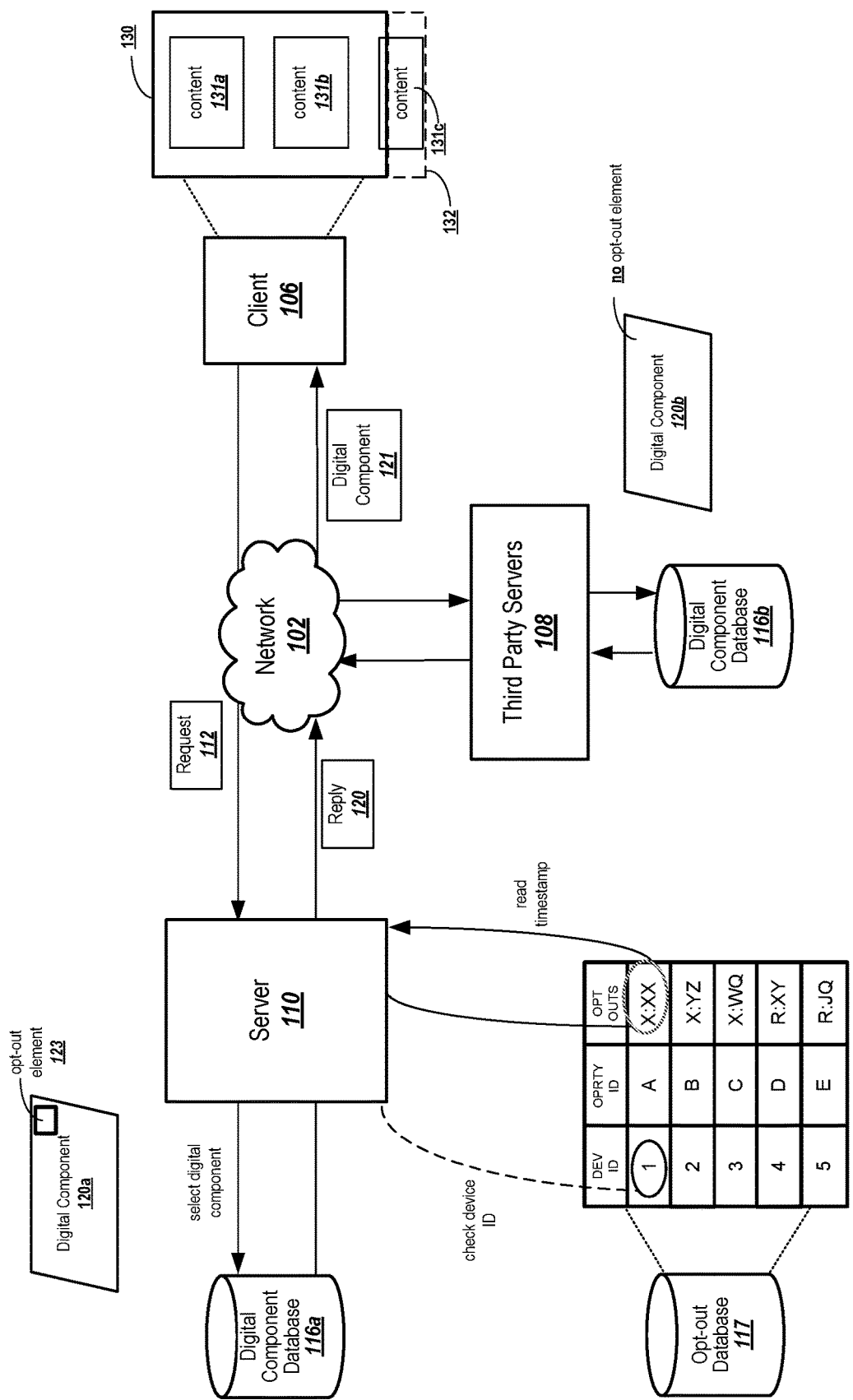

FIG. 2B is an example data flow 230 for selecting and distributing a digital component in the example environment of FIG. 1. The flow 230 improves opt-out compliance by only providing content when a unique identifier associated with a user is recorded as having been presented with an opt-out opportunity. The opt-out opportunity can be provided through a visible opt-out element included with a digital component previously presented to the user. The flow 230 involves a third party server 108 and a server 110.

Server 110 receives a request 112 from the client device 106. As described above, request 112 is a request for content to be presented. The request 112 can include interaction tracking data from the client device 106. For example, the request 112 can include tracking data such as an indication of the web resource the client device 106 is currently accessing and an identifier that uniquely identifies the client device 106.

In some implementations, the interaction tracking data includes a portion of code with which interactions are tracked. The interaction tracking data can include other data, such as an identifier that uniquely identifies the client device 106, an identifier that uniquely identifies the digital component with which the client device 106 interacted, a server identifier, and/or location information of the client device 106. The request 112 can include a unique identifier associated with a user. The unique identifier can be, for example, a device identifier that is uniquely associated with the client device 106 of the user.

Figure 3:
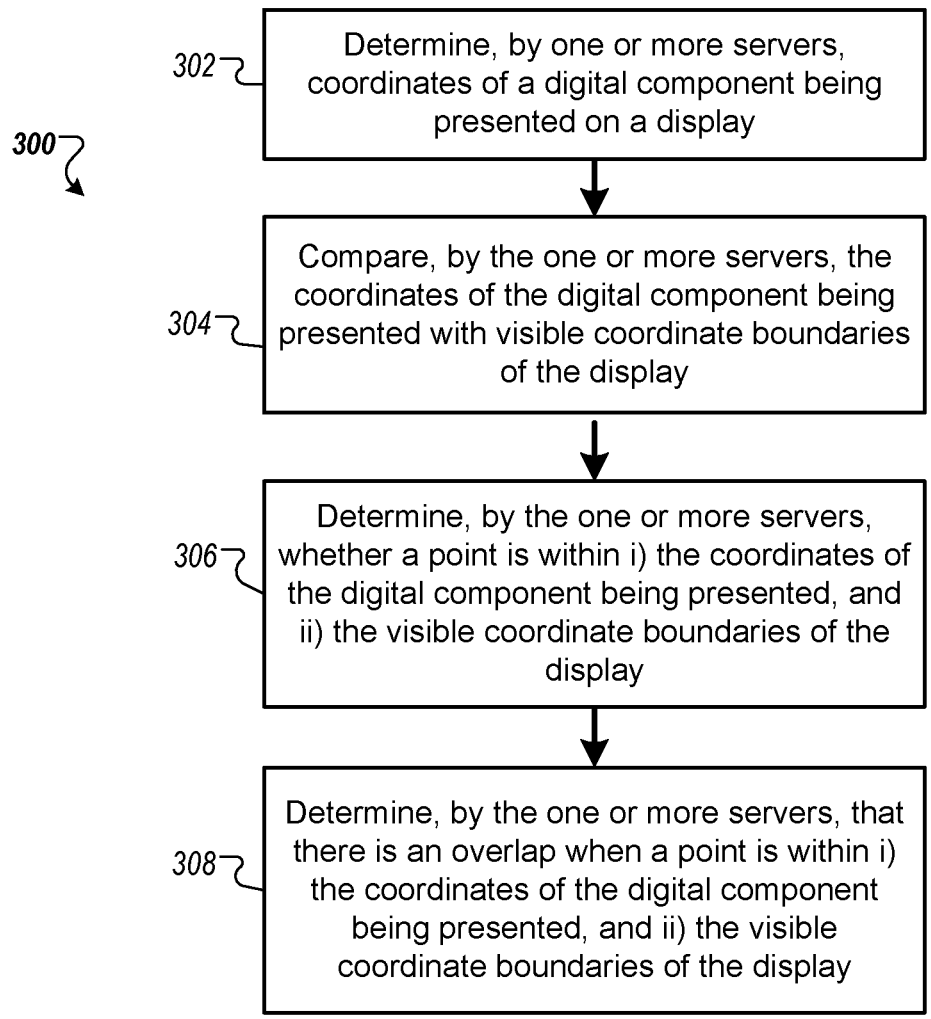
FIG. 3 is a flow chart of an example process for determining that a digital component including an opt-out element is visible.

Server 110 identifies, from the request 112, the unique device identifier associated with the request 112, and accesses the opt-out database 117 to determine whether an entry stored in the opt-out database 117 is mapped to a user associated with the unique identifier, and whether the entry indicates that the user has been presented with a visible opt-out opportunity that was within a specified period of time using the process as described with respect to FIG. 3.

The opt-out database 117 stores data regarding opt-out opportunities that have been presented to particular client devices. The data includes timestamped entries specifying when a particular user corresponding to a particular unique identifier was presented with an opt-out opportunity. The data allows server 110 to determine whether a user was presented with an opt-out opportunity within a given amount of time. The data can also be used to determine how long a user has been presented with an opt-out opportunity or a digital component. For example, the data can be used to measure and log how long the opt-out opportunity was perceivable—if a user was presented with a visible opt-out opportunity from a timestamp at 10:10:21 a.m. to 10:10:31 a.m., the user saw the opt-out opportunity for 10 seconds.

Server 110 can determine, based on the accessed data from database 117 that the user is on the whitelist and that the digital component does not need to include an opt-out element 123. Server 110 can choose the digital component from the digital component database 116a, or server 110 can forward the opportunity to present digital content to the client device 106 to third party server 108, which will select from digital component database 116b.

When providing content to users in response to a request, it may not be possible to provide an opt-out opportunity prior to responding to the request or providing the digital component. Therefore, the opt-out opportunity can be included in the digital component provided to ensure that a user is provided with the opportunity. Because third party servers, such as the third party server 108, can obtain content from various sources, it is not guaranteed that digital components provided by the third party server 108 will include an opt-out opportunity. In order to guarantee that an opt-out element is included in a digital component presented to a user, the digital component is selected and served from the DCDS 110 rather than sending the opportunity to present a digital component to a third party that may not include the opt-out element. When server 110 has determined that the user has been presented with an opt-out opportunity through presentation of an opt-out element within a specified amount of time, server 110 can determine that the user may be presented with content including a digital component. Because the user has already been presented with an opt-out opportunity within the specified amount of time and therefore may be presented with content, server 110 can determine to provide the opportunity to present a digital component to the third party server 108, which is not guaranteed to include an opt-out opportunity.

Once the digital component is selected from digital component database 116a, server 110 forwards the digital component information in reply 120. Server 110 transmits reply 120 to the client device 106 over the network 102. The reply 120 can include data representing the selected digital component, as well as an embedded script that causes the client device 106 to generate a response to server 110 that includes the opportunity identifier for the presentation opportunity when the selected digital component is visible at the client device 106. If, instead, the opportunity to present digital content is forwarded to third party server 108, once the digital component is selected by third party server 108 from the digital component database 116b, third party server 108 forwards the digital component 124 to the client device 106 for presentation.

In other examples, server 110 can determine, based on the accessed data from database 117 that the user is not on the whitelist, and that the digital component needs to include an opt-out element 123. Therefore, to help ensure that the digital component includes the opt-out element 123, the opportunity to present digital content to the client device 106 is retained by server 110, and server 110 selects a digital component from the database 116*a*. Once the digital component is selected from database 116*a*, server 110 provides data identifying the selected digital component in the reply 120.

By determining whether the digital component to be presented to the user associated with the request should include an opt-out element, the system 100 as described with respect to FIG. 2A reduces the amount of computer resources required to generate and transmit the digital component to a client device. Furthermore, when a digital component is not required to include an opt-out element, the system 100 can provide the requesting device with a digital component that does not include an opt-out element, reducing latency between when the component is requested and when the device receives the component. Additionally, more users can be reached and can receive digital content than in systems that do not determine whether users have previously exercised an opt-out option based on a unique identifier. For example, some systems will not provide users with digital content when the users do not have the choice to opt-out. The system 100 allows users who were previously unable to opt-out across platforms to opt-out and to access digital content.

Figure 2C:
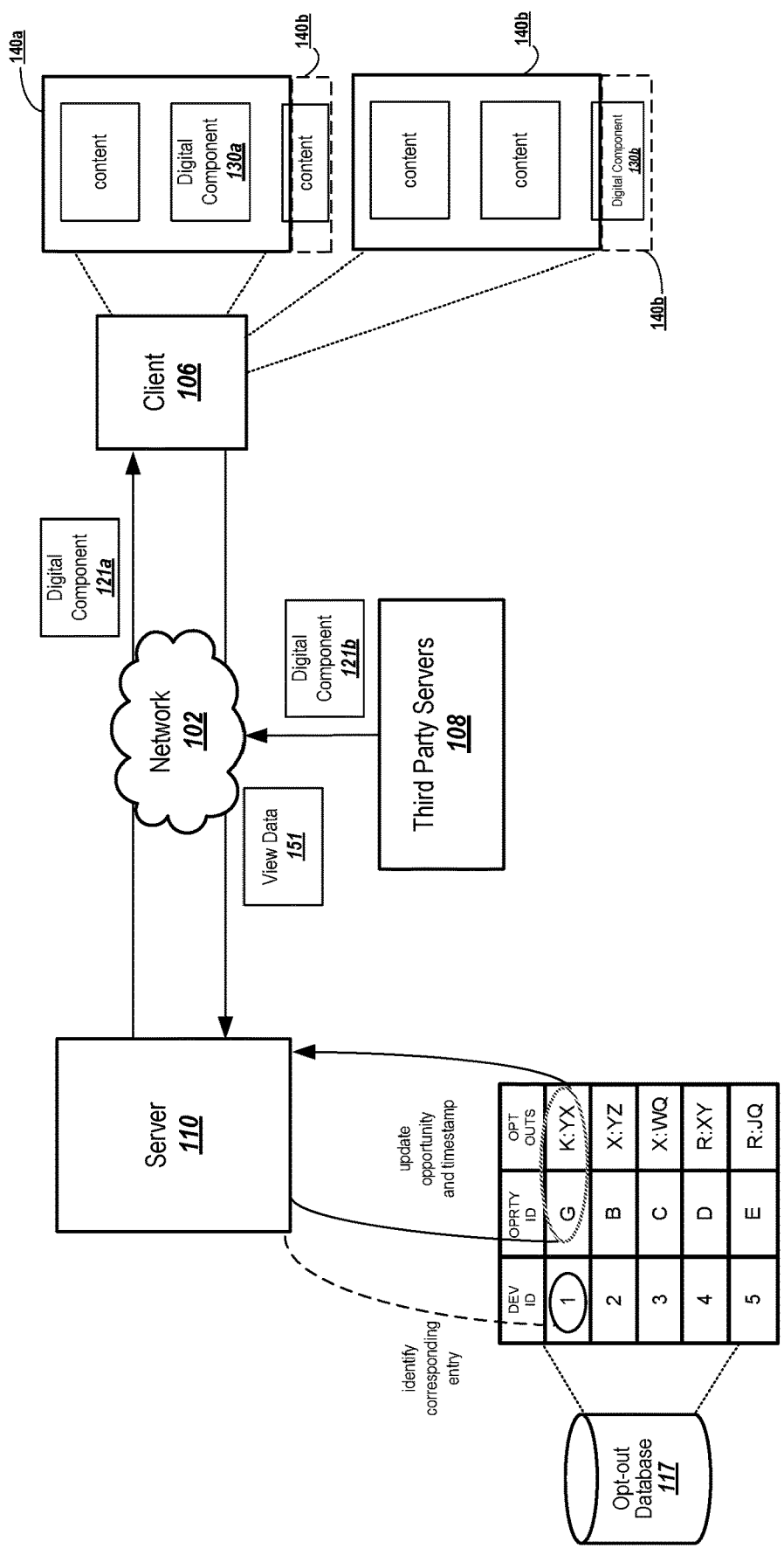
FIG. 2C is an example data flow for determining whether a user has previously opted-out of receiving digital components.

FIG. 2C is an example data flow 260 for determining whether a user being presented with a digital component has been given a visible opportunity to opt-out of receiving digital content. The process shown in flow 260 collects data on the interaction between a user and the digital component being presented and populates the opt-out database 117, improving opt-out compliance by retaining a record of users who have declined to opt-out and have therefore opted-in to receiving digital content. In some implementations, a web resource can contain more content than can be displayed at once within a viewport of a client device. For example, a web page can contain several large paragraphs of text, and if a user does not scroll down, the user cannot view all of the text. If a digital component including the opt-out opportunity is presented within the content that is not visible to the user, the user has not seen the opt-out opportunity, and therefore has not been presented with an opportunity to opt-out. The system 100 ensures that a user is actually given the opportunity to opt out by determining whether the digital component that includes the opt-out element is within a viewport of the user's device. The flow 230 involves third party server 108, server 110, and client device 106.

The client device 106 receives a digital component along with an embedded script from either server 110 or third party server 108. The embedded script causes the client device 106 to generate a response to server 110 that includes the opportunity identifier associated with the presentation opportunity in response to which the digital component is being provided. Server 110 selects a digital component 121*a* for presentation to the client device 106 and transmits the digital component 121*a* to the client device 106 through the network 102 as described in further detail with respect to FIGS. 2A, 2B, and 4. Server 108 selects a digital component 121*b* from third party sources for presentation to the client device 106 through the network 102 as described in further detail with respect to FIGS. 2A, 2B, and 4.

The digital component 121*a* can include an opt-out element, and is presented by the client device 106 on a display of the client device 106. Server 110 determines, based on whether a user has previously been provided with an opt-out opportunity and has declined the opportunity within a specified period of time, whether the digital component 121*a* must include an opt-out element. When the user has opted-out within the specified period of time, server 110 determines that the digital component 121*a* does not need to include an opt-out element. In some implementations, server 110 can forward the opportunity to present a digital component without an opt-out element to server 108 instead.

Digital component 121*b* can include an opt-out element. However, because third party server 108 presents data from various sources, it is not guaranteed that (and potentially not possible to guarantee whether) a digital component provided by server 108 includes an opt-out element. When server 110 determines that an opportunity to present a digital component to a user does not require that the digital component include an opt-out element, server 110 can forward the opportunity to server 108. Server 108 then selects the digital component 121*b*, which can include an opt-out element, but is not required to.

Once the client device 106 receives a digital component (either the digital component 121*a* from server 110 or the digital component 121*b* from server 108) the client device 106 displays the digital component. The digital component's position within the web resource accessed by the user of the client device 106 and presented on the display of the client device 106 varies. For example, a digital component 141*a* is presented within a visible portion of the display of the client device 106 in a viewport 140*a*. In some examples, a digital component 141*b* is presented outside of the viewport 140*a* of the display of the client device 106, and is instead presented within an obscured, or not-visible portion of the display of the client device 106 in a portion 140*b*.

Presentation information and interaction information are collected and transmitted from the client device 106 to server 110 over the network 102 as view data 151. Presentation information can include coordinate information for the digital component 141 (either the digital component 141*a* or the digital component 141*b*) and an opt-out element of the digital component 141, coordination information for the viewport 140*a*, a unique identifier associated with the user as described above with respect to FIGS. 2A and 2B, and an opportunity identifier for the particular presentation opportunity. The embedded script transmitted with the digital component can extract coordinate information for the digital component, the opt-out element, and the viewport of the client device 106, and return response information if the digital component is determined to have been visible within the viewport of the client device 106 as described in detail with respect to FIG. 3. In some implementations, server 110 uses the view data 151 to determine whether the digital component and its included opt-out element was visible as described with respect to FIG. 3.

Server 110 can populate the opt-out database 117 with the view data 151 from the client device 106. Server 110 extracts and stores data including the unique identifier associated with a user of the client device 106, the opportunity identifier, and a timestamp of when the digital component was presented and visible to the user in the opt-out database 117. In some implementations, server 110 stores additional data in the opt-out database 117, including additional digital component information such as a topic or content type, user demographic information, or information regarding the web resource being accessed by the client device 106 at the time the request for a digital component was generated. For example, server 110 can record that the digital component presented relates to a TV show about home improvement, and that the web site the user was accessing was an online inventory for a hardware store.

In some implementations, third party server 108 can also populate the opt-out database 117 in various ways, including through collection of the unique identifier associated with the user of the client device 106 through third party software development kits (SDKs) integrated with certain third party applications in communication with server 108.

The unique identifier can be transmitted to server 110 or server 108 when a digital component is served in response to a request. The unique identifier is transmitted if the user has been presented with an opt-out opportunity and did not exercise the opt-out option within a specified period of time. In some implementations, whether the unique identifier is transmitted and the specified period of time can depend on laws and regulations within a certain region. For example, if the client device 106 is in China and the user did not opt-out when presented with the visible opportunity to opt-out within the last 3 days, the executable script transmitted with the digital component can cause device 106 to transmit the unique identifier to server 110.

In some implementations, the opt-out database 117 can regulate whether data is accepted. For example, when content providers attempt to populate the opt-out database 117, the opt-out database 117 can selectively accept unique identifiers for storage only if the user has been presented with a visible opportunity to opt-out and has not done so within the last 30 days. Different uses of the unique identifiers stored within the opt-out database 117 can be governed by factors such as a specified period of time. For example, the unique identifier can be used for conversion tracking if the user was presented with an opt-out opportunity within the last 120 days.

Server 110 and server 108 identify from the view data 151 the unique identifier, and access the opt-out database 117 to determine whether there is a corresponding entry mapped to the unique identifier. When the unique identifier already exists in the opt-out database 117, in other words, when the user associated with the unique identifier has been presented with a visible opt-out opportunity and has declined to opt-out, the entry in the opt-out database 117 corresponding to the unique identifier can be updated. Data such as the current digital component presentation opportunity identifier or the opt-out timestamp can be updated for an entry corresponding to a particular unique identifier.

When the unique identifier does not already exist in the opt-out database 117, the system 100 is encountering the user for the first time, the user associated with the unique identifier has previously opted-out, the user is a new user, or the user has a new unique identifier. In such examples, server 110 or server 108 can create an entry in the opt-out database 117 indexed by the unique identifier and including data such as the digital component presentation opportunity and the time at which the opt-out opportunity included in the digital component was visibly presented to the user associated with the unique identifier.

When presented with the opt-out opportunity, the user can decide to exercise their right to opt-out. When a user opts-out using an opt-out element included in a digital component, the executable script causes the client device 106 to transmit data to server 110 to change the status of the user within the opt-out database 117. In other implementations, the entry indexed by the unique identifier associated with the user can be flagged as opted-out, and that no opportunities to present digital content to the user should be generated. For example, a flag bit of the entry stored in the opt-out database 117 can be flipped to indicate that the user has opted out. In some implementations, the executable script transmitted with the digital component can cause the client device 106 to transmit data to server 110 to remove the entry indexed by the unique identifier associated with the user entirely. In either case, the user is effectively removed from the whitelist of users to whom digital content can be presented. By removing the user's entry from the opt-out database 117, however, the system 100 ensures that the user is not presented with digital content, as it is possible that some third party content providers that use the whitelist stored in the opt-out database 117 may not check whether the opt-out flag is set. In some examples, a user who exercises their right to opt-out can be added to a separate list, such as a blacklist, of users who are known to have opted-out of receiving digital components. The blacklist can maintain information on when the user exercised the opt-out option. For example, the blacklist can include timestamps of when a user opted-out of receiving digital components.

FIG. 3 is a flow chart of an example process 300 for determining that a digital component including an opt-out element is visible. In some implementations, the process 300 can be implemented by one or more servers. For example, the process 300 can be implemented by server 110 and third party server 108 of FIGS. 1-2C. In some implementations, the process 300 can be implemented as instructions stored on a non-transitory computer readable medium, and when the instructions are executed by one or more servers, the instructions can cause the one or more servers to perform operations of the process 300.

A client device can request a digital component while accessing a particular web resource. The request is received, processed, and fulfilled by one or more servers that provide a digital component to the client device in response to the request. This digital component includes an opt-out element through which a user can choose to opt-out of receiving digital content. Once the digital component is rendered by a client device, an executable script attached to the digital component can identify parameter values of the digital component and the environment in which the digital component is presented.

One or more servers can determine coordinates of a digital component being presented on a display (302). The digital component can be displayed on a client device communicating over a wireless communications network. In some implementations, one or more servers can be used to implement server 110, which analyzes opt-out and interaction data from the client device 106. The one or more servers communicate over a wired communications network independent of the client device 106, which can be a mobile device. For example, as discussed above with respect to FIG. 2B, a digital component can be transmitted for presentation at the client device 106 with an executable script that identifies coordinates of the digital component and determines whether the user has interacted with the opt-out element.

The executable script can transmit the coordinates of the digital component and the coordinates of a visible boundary of the display. For example, the visible boundary of the display can be implemented as the viewport 130, and the executable script can determine the coordinate boundaries of an image digital component and the coordinates of the viewport 130. When determining the coordinates of the digital component, the executable script identifies the x-y coordinates of the boundaries of the digital component. For example, if the digital component is rectangular in shape, the executable script can identify the vertices of the digital component. In some implementations, the digital component has an irregular shape, and the executable script can identify vertices of the digital component that, when connected, define a boundary around the digital component such that the entirety of the digital component is contained, and such that as little area outside of the digital component as possible is contained.

When determining the coordinates of the visible boundary of the display, the executable script can identify the x-y coordinates of the vertices of the display. In some implementations, the executable script can obtain the coordinates of the boundaries of the display from the client device itself. For example, parameters of the client device can be accessed by the executable script.

In some implementations, the executable script can identify the x-y coordinates of the opt-out element included with the digital component. The coordinates of the opt-out element can be used in cases when the opt-out element has less visible area than the digital component, and therefore the possibly exists that the digital component is visible within the viewport, while the opt-out element is not.

The executable script can also identify the coordinates of other user interface elements that are visible within the viewport of the display. The coordinates of the other user interface elements can be used to determine various visibility characteristics of the interface elements being presented on the display of the client device. For example, the one or more servers can use the coordinates of other user interface elements visible within the viewport can be used along with the coordinates of the digital component to determine whether the other user interface elements are overlapping with, or obscuring, the digital component. More specifically, the one or more servers can compare the coordinates of the boundary of the digital component with the coordinates of the boundaries of the other user interface elements, and determine based on the comparison, whether there is overlap in the display space occupied by the digital component and the other user interface elements. When determining whether the other user interface elements and the digital component are overlapping, the one or more servers can use other parameter values for the other user interface elements or the digital component identified by the executable script, such as whether the element is at the forefront of (e.g., overlaying) the visible stack of elements within the viewport. For example, when there is overlap between the digital component and another user interface element, the determination of whether the digital component is actually presented will depend on whether the digital component is at the forefront of the stack (e.g., overlaying the other user interface element). When the digital component is at the forefront it will occlude the other user interface element (and be presented), whereas when the other user interface element is at the forefront it will occlude the digital component, thereby making the digital component not presented even if it is located at coordinates within the visible display.

The one or more servers can compare the coordinates of the digital component being presented with visible coordinate boundaries of the display (304). The one or more servers can compare the coordinates of the digital component with the boundary coordinates of the viewport. For example, the one or more servers can compare the x coordinates of the digital component to the x coordinates of the viewport, and the y coordinates of the digital component to the y coordinates of the viewport. If there are other user interface elements, the one or more servers can compare the x coordinates of the other user interface elements to the x coordinates of the viewport and of the digital component and the y coordinates of the other user interface elements to the y coordinates of the viewport and of the digital component. Any of the particular coordinates of the digital component, other user interface elements, or the viewport can be compared to each other.

The one or more servers can determine whether a point is within i) the coordinates of the digital component being presented, and ii) the visible coordinate boundaries of the display (306). The one or more servers determine whether a point is within the coordinates of the digital component being presented using the determined x-y coordinates of the digital component. The one or more servers compare the x-y coordinates of the point to the boundary coordinates of the digital component to determine whether the x coordinate of the point is both less than the largest x coordinate of the digital component and greater than the smallest x coordinate of the digital component, and to determine whether the y coordinate of the point is both less than the largest y coordinate of the digital component and greater than the smallest y coordinate of the digital component. The one or more servers compare the x-y coordinates of the point to the visible coordinate boundaries of the display, or the viewport, to determine whether the x coordinate of the point is both less than the largest x coordinate of the viewport and greater than the smallest x coordinate of the viewport, and to determine whether the y coordinate of the point is both less than the largest y coordinate of the viewport and greater than the smallest y coordinate of the viewport. Additionally, the one or more servers can verify a percentage of the opt-out opportunity that was visible on screen. For example, if an opt-out opportunity consists of two paragraphs of text, the system could check if the entirety of the two paragraphs was fully in view. The one or more servers can log the length of time for which the opt-out opportunity was in view and determine, for example, whether the opt-out opportunity was visible for long enough that a user could read and comprehend the opt-out opportunity being presented.

The one or more servers can determine that there is an overlap when a point is within i) the coordinates of the digital component being presented, and ii) the visible coordinate boundaries of the display (308). If a point exists within the digital component being presented and within the visible coordinate boundaries of the display, or the viewport, the one or more servers can determine that at least a portion of the digital component is visible within the viewport. In some implementations, the one or more servers determine a percentage of overlap between the digital component and the viewport by comparing boundary coordinates of the digital component to boundary coordinates of the viewport. The one or more servers can use a threshold percentage, or a specific portion of the digital component that must be within the viewport in order to determine an overlap. For example, if only 2% of the digital component is visible within the viewport, it is possible that the digital component and its opt-out element are not noticed by the user. In another example, if the opt-out element is placed in the bottom 10% of the digital component, and only the top 10% of the digital component is visible, then the opt-out element is not visible, even if the digital component is.

The one or more servers can also determine whether there are any other user interface elements within the viewport. This determination can be used to determine whether any elements are covering the digital component. For example, the one or more servers can use the same comparison method as described above with respect to the point and the digital component or the point and the viewport to determine whether a point within a user interface element is within the viewport. If the user interface element overlaps with the viewport, then the one or more servers can determine whether the user interface element overlaps with the digital component using the same comparison method as described above. The one or more servers can also use parameter values, such as whether the user interface element is at the forefront of a stack of visible elements within the viewport to determine whether there is a visible overlap. If, for example, the other user interface elements are in the background in a different application window and are covered by the application window in which the digital component is presented, the one or more servers will not expend the computing resources to determine whether the user interface elements overlap with the digital component. The one or more servers can use temporal or spatial criteria to determine whether a digital component or an opt-out opportunity within the digital component is visible. For example, the one or more servers can determine that a digital component is visible if a predetermined threshold percentage of the digital component is visible, and that the percentage of the digital component is visible for a predetermined threshold amount of time on a user's display.

The one or more servers can determine that no opt-out opportunity was provided to a particular user if the digital component including the opt-out element was not visible within the viewport. If, however, the digital component was visible within the viewport, the one or more servers can determine that the user was provided with the opportunity to opt-out. The one or more servers then determine whether the user interacted with the opt-out element to determine whether the user opted-out of receiving digital content, in which case further opportunities to present digital components to the client device of the user cannot be generated. The one or more servers can use interaction data provided by the executable script to determine whether the user opted-out of receiving data. In some implementations, the executable script does not provide any interaction data if the user interacts with the opt-out element. For example, if the user clicks a button to opt-out of receiving further digital content, the executable script may not transmit the coordinates of the digital component to the one or more servers, thus conserving computing and network resources. If, however, the user declines to check a box to opt-out of receiving further digital content, the executable script may provide interaction data indicating that the user The executable script pings the one or more servers with the unique identifier if there is determined to be an overlap, and the one or more servers can store data in a database indicating that the user has been presented with a visible digital component as described above with respect to FIG. 2C. The one or more servers build a whitelist of users to whom digital content can be presented by storing the unique identifiers that identify the users to whom an opt-out opportunity was presented and who declined to opt-out. This whitelist can be used by the one or more servers to determine whether to select a digital component for presentation or to forward the presentation opportunity to a third party server that is not guaranteed to provide an opt-out element with the digital component.

Figure 4:
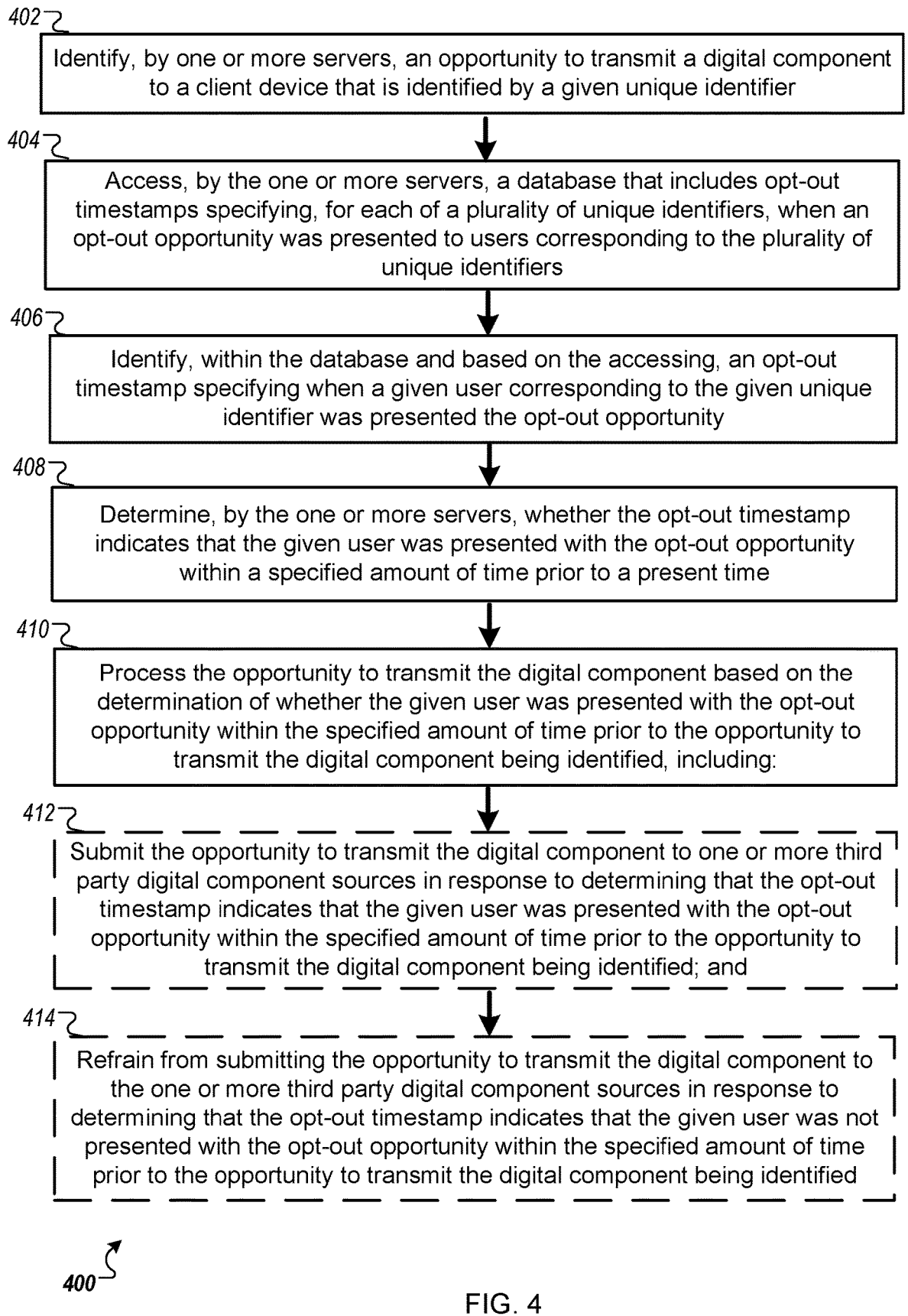
FIG. 4 is a flow chart of an example process for determining to refrain from submitting an opportunity to transmit a digital component to a user.

FIG. 4 is a flow chart of an example process 400 for determining that a digital component including an opt-out element is visible. In some implementations, the process 400 can be implemented by one or more servers. For example, the process 400 can be implemented by server 110 and third party server 108 of FIGS. 1-2C. In some implementations, the process 400 can be implemented as instructions stored on a non-transitory computer readable medium, and when the instructions are executed by one or more servers, the instructions can cause the one or more servers to perform operations of the process 400.

One or more servers can identify an opportunity to transmit a digital component to a client device that is identified by a given unique identifier (402). The one or more servers receive a request from the client device for a digital component. The request can include client device information such as the geographical location of the client device, a software application currently in use by the user of the client device or being used to access a web resource that triggered the request, a content presentation platform used by the client device, and an operating system of the device. The unique identifier can be, for example, a unique device identifier as described above with respect to FIGS. 1-2. The one or more servers can use the unique identifier to access an opt-out database that stores opt-out data that maps entries of opt-out information to unique identifiers. The opt-out data stored in the database can be used, for example, as a whitelist of users who have declined to opt-out when presented with an opportunity, thus opting-in to receiving digital content, as described above with respect to FIGS. 1-2C.

The one or more servers access a database that includes opt-out timestamps specifying, for each of a plurality of unique identifiers, when an opt-out opportunity was presented to users corresponding to the plurality of unique identifiers (404). The one or more servers can access the opt-out database that stores the opt-out data using the unique identifier. The one or more servers can, for example, access the opt-out database and identify an opt-out entry corresponding to the unique identifier by identifying an entry indexed by the unique identifier. The one or more servers can search for entries within the opt-out database to identify the entry indexed by the unique identifier. If the unique identifier has never been encountered before, there will be no corresponding entry in the opt-out database. In some implementations, if the user identified by the unique identifier has opted-out of receiving digital content, there will be no corresponding entry in the opt-out database.

The one or more servers identify, within the database and based on the accessing, an opt-out timestamp specifying when a given user corresponding to the given unique identifier was presented the opt-out opportunity (406). The opt-out information contained within an entry indexed by the unique identifier includes a timestamp of when an opt-out opportunity was presented to the given user associated with the unique identifier and a digital component presentation opportunity identifier. The opportunity identifier uniquely identifies the presentation opportunity, and the one or more servers can use the opportunity identifier to access information about the opportunity, including the web resource the client device was accessing, a topic of the web resource, or a host of the web resource. The one or more servers identify the entry indexed by the unique identifier and retrieve the timestamp of the latest. In some implementations, an entry indexed by the unique identifier is removed when the user identified by the unique identifier opts-out of receiving further digital content, and the only entries within the opt-out database are entries in which the user was presented with an opt-out opportunity and declined to exercise the option. The timestamp can be the timestamp of the most recent opt-out opportunity presented to the user identified by the unique identifier, and can indicate the last time the user was presented with an opt-out opportunity and did not opt-out.

The one or more servers determine whether the opt-out timestamp indicates that the given user was presented with the opt-out opportunity within a specified amount of time prior to a present time (408). The one or more servers compare the opt-out timestamp to the current timestamp to determine a period of time that has elapsed. The one or more servers can then determine whether the period of time that has elapsed is larger than the specified amount of time prior to a present time. The specified period of time can be set by various entities, including regulatory bodies, a platform on which the content is being presented on the client device, and the one or more servers. For example, the one or more servers can have a default specified period of time prior to the present time in which the user must have been presented with an opt-out opportunity. In another example, a regulatory body in the region (e.g., country, state, county, etc.) from which request to present content at the client device is generated determines the specified period of time.

The one or more servers process the opportunity to transmit the digital component based on the determination of whether the given user was presented with the opt-out opportunity within the specified amount of time prior to the opportunity to transmit the digital component being identified (410). Once server 110 identifies the opportunity to transmit a digital component, server 110 can determine the origin of the request. For example, server 110 can determine whether the opportunity originates from a country with particular opt-out regulations. These opt-out regulations may determine the specified amount of time used by the one or more servers.

The specified amount of time can be determined by regulations, such as privacy regulations for a particular region, environment, platform, etc. For example, privacy regulations for a particular country may require that a user be presented with an opt-out opportunity at least every fourteen days, and thus the specified amount of time must be, at most, fourteen days. The one or more servers determine, based on the comparison of the timestamp to the current time, the period, or amount, of time that has elapsed since the user was last presented with an opt-out opportunity. The one or more servers then compare the determined amount of time with the specified amount of time to determine whether the user was presented with the opt-out opportunity within the specified period of time. For example, if the determined amount of time is less than or equal to the specified amount of time, then the one or more servers can make the determination that the user was presented with an opt-out opportunity within the specified period of time. The one or more servers can then use the determination to process the opportunity to transmit the digital component to the client device.

Processing the opportunity to transmit the digital component includes submitting the opportunity to transmit the digital component to one or more third party digital component sources in response to determining that the opt-out timestamp indicates that the given user was presented with the opt-out opportunity within the specified amount of time prior to the opportunity to transmit the digital component being identified (412). If the one or more servers determine that the user was presented with the opt-out opportunity within the specified amount of time, then the one or more servers can determine to forward the opportunity to transmit the digital component to a third party server as described with respect to FIGS. 2A-2C. The one or more servers perform the processing in real time, and the specified period of time is determined with respect to the current time at the beginning of process 400, at which the opportunity to transmit the digital component is identified.

In some implementations, submitting the opportunity to transmit the digital component to one or more third party digital component sources in response to determining that the opt-out timestamp indicates that the given user was presented with the opt-out opportunity within the specified amount of time prior to the opportunity to transmit the digital component being identified is conditioned on the user having not requested to opt-out. For example, the user must have declined to exercise the option of opting-out, and if a user has exercised the option of opting-out, then the user identified by the unique identifier can be removed from the opt-out database.

Processing the opportunity to transmit the digital component includes refraining from submitting the opportunity to transmit the digital component to the one or more third party digital component sources in response to determining that the opt-out timestamp indicates that the given user was not presented with the opt-out opportunity within the specified amount of time prior to the opportunity to transmit the digital component being identified (414). If the one or more servers determine that the user was not presented with the opt-out opportunity within the specified amount of time, then the one or more servers can determine to refrain from forwarding the opportunity to transmit the digital component to a third party server as described with respect to FIGS. 2A-2C. For example, if the determined amount of time exceeds the specified amount of time, then the user has not been presented with an opt-out opportunity for at least the specified amount of time, and the one or more servers can determine to present an opt-out opportunity to the client device. In order to guarantee that such an opt-out opportunity is presented to the user, the one or more servers can determine to select a digital component that includes an opt-out element to present to the user, as some third party servers may source digital content from resources that do not reliably include opt-out opportunities with the digital content.

In some implementations, refraining from submitting the opportunity to transmit the digital component to the one or more third party digital component sources includes selecting, by the one or more servers, a given digital component that includes the opt-out opportunity rather than submitting the opportunity to the one or more third party digital component sources. The one or more servers then transmit the given digital component that includes the opt-out opportunity to the client device in response to identifying the opportunity to transmit a digital component to the client device. The one or more servers determine whether the given digital component that includes the opt-out opportunity was visually presented at the client device, and then log data in the opt-out database based on the determination of whether the digital component that includes the opt-out opportunity was visually perceivable at the client device. For example, the one or more servers can select and present a digital component to a client device and determine whether the digital component was visually presented at the client device as described with respect to FIGS. 2-3.

In some implementations, transmitting the given digital component that includes the opt-out opportunity includes transmitting the given digital component with an opportunity identifier that uniquely identifies the opportunity to transmit the digital component relative to other opportunities to transmit digital components and an embedded script that causes the client device to generate a response that includes the opportunity identifier when the given digital component is visually perceivable at the client device as described with respect to FIGS. 2-3.

In some implementations, determining whether the given digital component that includes the opt-out opportunity was visually perceivable at the client device includes determining that the response received from the client device indicates that the given digital component was visually perceivable at the client device and includes the opportunity identifier as described with respect to FIGS. 2-3.

In some implementations, logging data in the database comprises logging, in the database, an updated opt-out timestamp at a location of the database corresponding to the given unique identifier, the updated opt-out timestamp indicating a time at which the given digital component was visually perceivable at the client device as described with respect to FIGS. 2-3.

The process 400 can further include identifying a subsequent opportunity to transmit a digital component to the client device after the updated opt-out timestamp is logged in the database. The one or more servers can then determine that the updated opt-out timestamp indicates that the given user was presented with the opt-out opportunity within the specified amount of time prior to the subsequent opportunity, and in response to determining that the updated opt-out timestamp indicates that the given user was presented with the opt-out opportunity within the specified amount of time prior to the subsequent opportunity, submit the opportunity to transmit the digital component to one or more third party digital component sources as described with respect to FIGS. 2-3.

Figure 5:
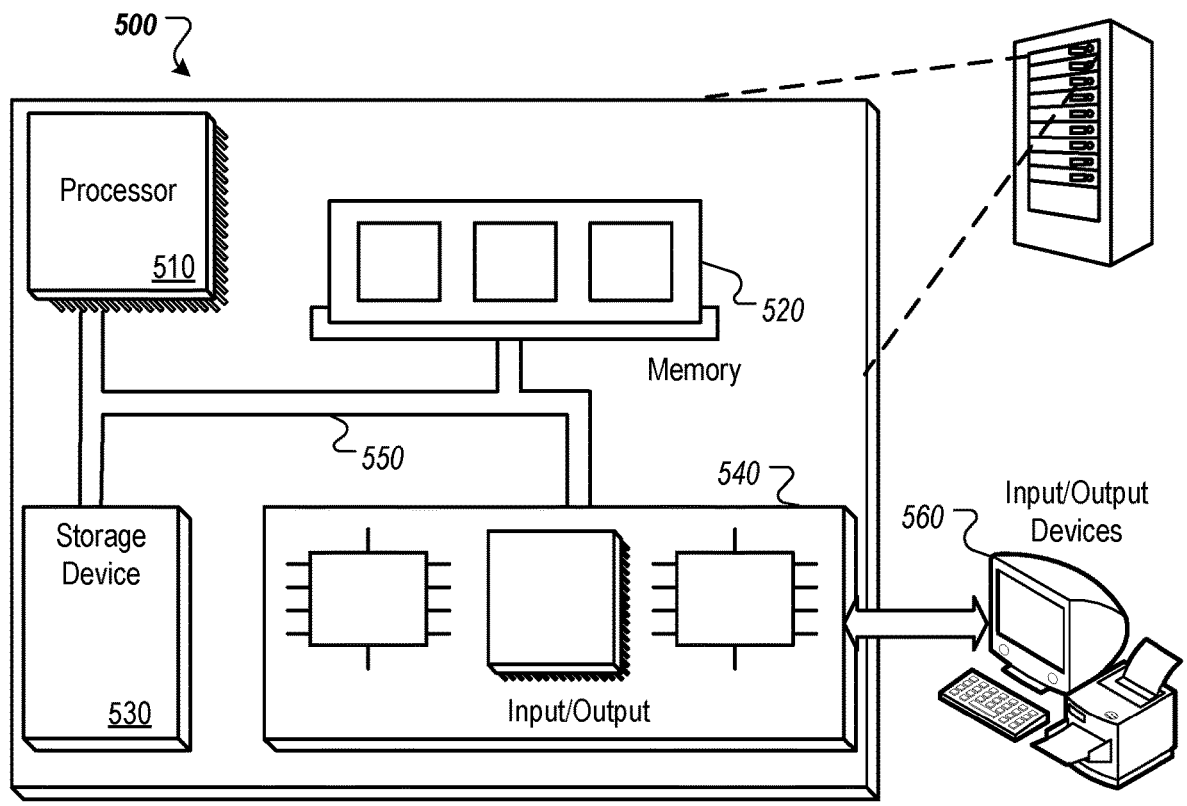
FIG. 5 is a block diagram of an example computing system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including, by way of example, a programmable processor, a computer, a system on a chip, or multiple ones, or combinations, of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special-purpose logic circuitry, e.g., an FPGA (field-programmable gate array) or an ASIC (application-specific integrated circuit).

Processors suitable for the execution of a computer program include, by way of example, both general and special-purpose microprocessors. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special-purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    identifying, by one or more servers, an opportunity to transmit a digital component to a client device that is identified by a given unique identifier;

accessing, by the one or more servers, a database that includes opt-out timestamps specifying, for each of a plurality of unique identifiers, when an opt-out opportunity providing the respective user with an opportunity to opt-out of receiving digital components was presented by an opt-out server to users corresponding to the plurality of unique identifiers;

identifying, within the database and based on the accessing, an opt-out timestamp specifying when the opt-out server presented a given user corresponding to the given unique identifier with the opt-out opportunity and for how long the opt-out opportunity was presented to the given user;

determining, by the one or more servers, whether the opt-out timestamp indicates that the given user was visually presented within a viewport at the client device with the opt-out opportunity within a specified amount of time prior to a present time and declined the opt-out opportunity;

processing the opportunity to transmit the digital component based on the determination of whether the given user was visually presented within a viewport at the client device with the opt-out opportunity within the specified amount of time prior to the opportunity to transmit the digital component being identified, including:

submitting the opportunity to transmit the digital component to one or more third party digital component sources in response to determining that the opt-out timestamp indicates that the given user was visually presented within a viewport at the client device with the opt-out opportunity within the specified amount of time prior to the opportunity to transmit the digital component being identified; and refraining from submitting the opportunity to transmit the digital component to the one or more third party digital component sources in response to determining that the opt-out timestamp indicates that the given user was not visually presented within a viewport at the client device with the opt-out opportunity within the specified amount of time prior to the opportunity to transmit the digital component being identified, further comprising:

selecting, by the one or more servers, a given digital component that includes the opt-out opportunity rather than submitting the opportunity to the one or more third party digital component sources; and transmitting, by the one or more servers, the given digital component with an opportunity identifier that uniquely identifies the opportunity to transmit the digital component relative to other opportunities to transmit digital components and an embedded script that causes the client device to generate a response that includes the opportunity identifier when the given digital component is visually perceivable at the client device.

2. The method of claim 1, wherein refraining from submitting the opportunity to transmit the digital component to the one or more third party digital component sources further comprises:

determining, by the one or more servers, whether the given digital component that includes the opt-out opportunity was visually presented at the client device; and logging data in the database based on the determination of whether the digital component that includes the opt-out opportunity was visually perceivable at the client device.

3. The method of claim 2, wherein determining whether the given digital component that includes the opt-out opportunity was visually perceivable at the client device comprises determining that the response received from the client device indicates that the given digital component was visually perceivable at the client device and includes the opportunity identifier.

4. The method of claim 3, wherein logging data in the database comprises logging, in the database, an updated opt-out timestamp at a location of the database corresponding to the given unique identifier, the updated opt-out timestamp indicating a time at which the given digital component was visually perceivable at the client device.

5. The method of claim 4, comprising:

identifying a subsequent opportunity to transmit a digital component to the client device after the updated opt-out timestamp is logged in the database;

determining that the updated opt-out timestamp indicates that the given user was presented with the opt-out opportunity within the specified amount of time prior to the subsequent opportunity; and in response to determining that the updated opt-out timestamp indicates that the given user was presented with the opt-out opportunity within the specified amount of time prior to the subsequent opportunity, submitting the opportunity to transmit the digital component to one or more third party digital component sources.

6. The method of claim 1, wherein submitting the opportunity to transmit the digital component to one or more third party digital component sources in response to determining that the opt-out timestamp indicates that the given user was presented with the opt-out opportunity within the specified amount of time prior to the opportunity to transmit the digital component being identified is conditioned on the user having not requested to opt-out.

7. A system, comprising:

a front-end interface that includes a communications interface that enables communication over one or more communications networks and performs operations including:

receiving, from a client device that is identified by a given unique identifier, a request to transmit a digital component to a the client device;

a back-end interface connected to the front-end interface, wherein the back-end interface performs operations including:

identifying, based on the received request, an opportunity to transmit a digital component to the client device;

accessing a database that includes opt-out timestamps specifying, for each of a plurality of unique identifiers, when an opt-out opportunity providing the respective user with an opportunity to opt-out of receiving digital components was presented by an opt-out server to users corresponding to the plurality of unique identifiers;

identifying, within the database and based on the accessing, an opt-out timestamp specifying when the opt-out server presented a given user corresponding to the given unique identifier with the opt-out opportunity and for how long the opt-out opportunity was presented to the given user;

determining whether the opt-out timestamp indicates that the given user was visually presented within a viewport at the client device with the opt-out opportunity within a specified amount of time prior to a present time and declined the opt-out opportunity;

processing the opportunity to transmit the digital component based on the determination of whether the given user was visually presented within a viewport at the client device with the opt-out opportunity within the specified amount of time prior to the opportunity to transmit the digital component being identified, including:
submitting the opportunity to transmit the digital component to one or more third party digital component sources in response to determining that the opt-out timestamp indicates that the given user was visually presented within a viewport at the client device with the opt-out opportunity within the specified amount of time prior to the opportunity to transmit the digital component being identified; and
refraining from submitting the opportunity to transmit the digital component to the one or more third party digital component sources in response to determining that the opt-out timestamp indicates that the given user was not visually presented within a viewport at the client device with the opt-out opportunity within the specified amount of time prior to the opportunity to transmit the digital component being identified, further comprising:
selecting, by the one or more servers, a given digital component that includes the opt-out opportunity rather than submitting the opportunity to the one or more third party digital component sources; and
transmitting, by the one or more servers, the given digital component with an opportunity identifier that uniquely identifies the opportunity to transmit the digital component relative to other opportunities to transmit digital components and an embedded script that causes the client device to generate a response that includes the opportunity identifier when the given digital component is visually perceivable at the client device.

8. The system of claim 7, wherein refraining from submitting the opportunity to transmit the digital component to the one or more third party digital component sources further comprises:
determining, by the one or more servers, whether the given digital component that includes the opt-out opportunity was visually presented at the client device; and
logging data in the database based on the determination of whether the digital component that includes the opt-out opportunity was visually perceivable at the client device.

9. The system of claim 8, wherein determining whether the given digital component that includes the opt-out opportunity was visually perceivable at the client device comprises determining that the response received from the client device indicates that the given digital component was visually perceivable at the client device and includes the opportunity identifier.

10. The system of claim 9, wherein logging data in the database comprises logging, in the database, an updated opt-out timestamp at a location of the database corresponding to the given unique identifier, the updated opt-out timestamp indicating a time at which the given digital component was visually perceivable at the client device.

11. The system of claim 10, the operations comprising:
identifying a subsequent opportunity to transmit a digital component to the client device after the updated opt-out timestamp is logged in the database;
determining that the updated opt-out timestamp indicates that the given user was presented with the opt-out opportunity within the specified amount of time prior to the subsequent opportunity; and
in response to determining that the updated opt-out timestamp indicates that the given user was presented with the opt-out opportunity within the specified amount of time prior to the subsequent opportunity, submitting the opportunity to transmit the digital component to one or more third party digital component sources.

12. The system of claim 7, wherein submitting the opportunity to transmit the digital component to one or more third party digital component sources in response to determining that the opt-out timestamp indicates that the given user was presented with the opt-out opportunity within the specified amount of time prior to the opportunity to transmit the digital component being identified is conditioned on the user having not requested to opt-out.

13. A non-transitory computer readable medium storing instructions that when executed by one or more computing devices, cause the one or more computing devices to perform operations comprising:
identifying, by one or more servers, an opportunity to transmit a digital component to a client device that is identified by a given unique identifier;
accessing, by the one or more servers, a database that includes opt-out timestamps specifying, for each of a plurality of unique identifiers, when an opt-out opportunity providing the respective user with an opportunity to opt-out of receiving digital components was presented by an opt-out server to users corresponding to the plurality of unique identifiers;
identifying, within the database and based on the accessing, an opt-out timestamp specifying when the opt-out server presented a given user corresponding to the given unique identifier with the opt-out opportunity and for how long the opt-out opportunity was presented to the given user;
determining, by the one or more servers, whether the opt-out timestamp indicates that the given user was visually presented within a viewport at the client device with the opt-out opportunity within a specified amount of time prior to a present time and declined the opt-out opportunity;
processing the opportunity to transmit the digital component based on the determination of whether the given user was visually presented within a viewport at the client device with the opt-out opportunity within the specified amount of time prior to the opportunity to transmit the digital component being identified, including:
submitting the opportunity to transmit the digital component to one or more third party digital component sources in response to determining that the opt-out timestamp indicates that the given user was visually presented within a viewport at the client device with the opt-out opportunity within the specified amount of time prior to the opportunity to transmit the digital component being identified; and
refraining from submitting the opportunity to transmit the digital component to the one or more third party digital component sources in response to determining that the opt-out timestamp indicates that the given user was not visually presented within a viewport at the client device with the opt-out opportunity within the specified amount of time prior to the opportunity to transmit the digital component being identified, further comprising:
selecting, by the one or more servers, a given digital component that includes the opt-out opportunity rather than submitting the opportunity to the one or more third party digital component sources; and transmitting, by the one or more servers, the given digital component with an opportunity identifier that uniquely identifies the opportunity to transmit the digital component relative to other opportunities to transmit digital components and an embedded script that causes the client device to generate a response that includes the opportunity identifier when the given digital component is visually perceivable at the client device.

14. The non-transitory computer readable medium of claim 13, wherein refraining from submitting the opportunity to transmit the digital component to the one or more third party digital component sources further comprises:
   determining, by the one or more servers, whether the given digital component that includes the opt-out opportunity was visually presented at the client device; and
   logging data in the database based on the determination of whether the digital component that includes the opt-out opportunity was visually perceivable at the client device.

15. The non-transitory computer readable medium of claim 14, wherein determining whether the given digital component that includes the opt-out opportunity was visually perceivable at the client device comprises determining that the response received from the client device indicates that the given digital component was visually perceivable at the client device and includes the opportunity identifier.

16. The non-transitory computer readable medium of claim 15, wherein logging data in the database comprises logging, in the database, an updated opt-out timestamp at a location of the database corresponding to the given unique identifier, the updated opt-out timestamp indicating a time at which the given digital component was visually perceivable at the client device.

17. The non-transitory computer readable medium of claim 13, wherein submitting the opportunity to transmit the digital component to one or more third party digital component sources in response to determining that the opt-out timestamp indicates that the given user was presented with the opt-out opportunity within the specified amount of time prior to the opportunity to transmit the digital component being identified is conditioned on the user having not requested to opt-out.

* * * * *